United States Patent [19]

Eide

[11] Patent Number: 4,596,236
[45] Date of Patent: Jun. 24, 1986

[54] STAINLESS STEEL COOKING VESSEL SUITABLE FOR ALL TYPES OF HEAT SOURCES

[75] Inventor: Svein Eide, Sandved, Norway

[73] Assignee: Årdal og Sunndal Verk a.s., Oslo, Norway

[21] Appl. No.: 771,466

[22] Filed: Aug. 30, 1985

Related U.S. Application Data

[63] Continuation of Ser. No. 556,160, Nov. 29, 1983, abandoned.

[30] Foreign Application Priority Data

Dec. 14, 1982 [NO] Norway .................................. 824193

[51] Int. Cl.⁴ .............................................. A47J 27/00
[52] U.S. Cl. ..................................... 126/390; 126/375; 126/373; 220/68
[58] Field of Search ...................... 126/390, 375, 373; 220/66, 68

[56] References Cited

U.S. PATENT DOCUMENTS

| | | | |
|---|---|---|---|
| 2,057,254 | 10/1936 | Sommer | 126/390 |
| 2,358,104 | 9/1944 | Scavullo | 126/390 X |
| 2,471,663 | 5/1949 | Tietz | 126/390 X |
| 2,653,117 | 9/1953 | Keene | 126/390 X |
| 2,841,137 | 7/1958 | Chace | 126/390 |
| 2,967,134 | 1/1961 | Scavullo | 126/390 |
| 2,969,452 | 1/1961 | Geller et al. | 126/390 |
| 3,650,710 | 3/1972 | Doucerain | |
| 3,675,310 | 7/1972 | Schwaneke et al. | |
| 3,684,853 | 8/1972 | Welch et al. | |
| 3,788,513 | 1/1974 | Racz | 126/390 |
| 3,966,426 | 6/1976 | McCoy et al. | |
| 3,970,237 | 7/1976 | Dockus | |
| 4,204,607 | 5/1980 | Zani | 126/390 |
| 4,356,259 | 9/1982 | Cartossi | 126/390 |
| 4,363,316 | 12/1982 | Aakenuj et al. | 126/390 |
| 4,533,807 | 8/1985 | Minamida | 126/390 |
| 4,544,818 | 10/1980 | Minamida | 126/390 |

FOREIGN PATENT DOCUMENTS

| | | | |
|---|---|---|---|
| 2453627 | 7/1980 | France | 126/390 |
| 1389573 | 4/1975 | United Kingdom | |
| 2014037 | 8/1979 | United Kingdom | |
| 2034173 | 1/1980 | United Kingdom | 126/373 |

Primary Examiner—Samuel Scott
Assistant Examiner—Helen Ann Odar
Attorney, Agent, or Firm—Wenderoth, Lind & Ponack

[57] ABSTRACT

A cooking vessel suitable for being heated by an induction heat source includes a base of austenitic stainless steel. A heat distributing layer is bonded to the exterior of the base, the heat distributing layer being formed of a metal having a high thermal conductivity. A magnetizable layer is connected to the exterior of the heat distributing layer. At least two intermediate layers are provided between and connect the magnetizable layer and the heat distributing layer. Each of the intermediate layers is formed of a material having a coefficient of thermal expansion value between the values of the coefficients of thermal expansion of the materials of the heat distributing layer and the magnetizable layer.

17 Claims, 4 Drawing Figures

STAINLESS STEEL COOKING VESSEL SUITABLE FOR ALL TYPES OF HEAT SOURCES

This application is a continuation, of now abandoned application Ser. No. 566,160, filed Nov. 29, 1983.

BACKGROUND OF THE INVENTION

This invention relates to cooking vessels of stainless steel with good boiling, baking and frying properties, irrespective to the heat source employed.

The use of stainless steel for making cookware has been known for many years, this metal being in many ways suitable for preparing food even though its cooking properties are not entirely good due to its relatively poor thermal conductivity. The various types of stainless steel have properties which, without modification, make them unsuitable for cookware which is to be used also for induction heating. Various attempts have been made to overcome these difficulties.

Austenitic stainless steel has very low magnetic permeability, and is thus not a suitable material for cookware for heating by all types of heat sources. Very good cooking properties have however been imparted to such cookware by strengthening the base with a plate of a metal with good thermal conductivity, for example aluminum or copper, thus making the cookware suitable for heating on an ordinary hotplate or by gas.

The bond between austenitic stainless steel and aluminium or copper has proved to be very strong, so that the extra base does not fall off, not even after prolonged use. However, attempts to heat up such a vessel on an induction plate are not successful because the metals of the vessel cannot, in practice, be magnetized.

Chromium steel, with its good magnetic permeability, has also been tried as a material for cookware. As with cookware of austenitic steel, it has been desirable to improve the cooking properties by brazing a copper plate onto the base, and a protective plate of chromium steel outside the copper plate. A saucepan or other type of cooking vessel of this type may be efficiently heated by an induction plate, but the base is not durable. The combination of chromium steel and copper suffers from too large a difference in the coefficients of thermal expansion so that the base becomes loose after only a short period of use.

Also, martensitic stainless steel has very good magnetic permeability. One proposal employs cookware of copper or aluminium clad on the outside and the inside with this stainless steel. However, the combination of martensitic stainless steel and copper suffers from the same large difference in the coefficients of thermal expansion as does the chromium steel-copper combination, and thus does not last. An even larger difference is shown in the combination of chromium steel and aluminum, and therefore this combination also is non-durable.

It thus has been proved in practice that the two above-mentioned types of stainless steel which have good magnetic permeability, i.e. chromium and martensitic, cannot, with conventional technology, be affixed firmly enough to aluminum or copper to be able to withstand the type of heating which is produced by high frequency electrical induction heating. The question of extending the range of use of stainless steel saucepans or other types of cooking vessels to include heating on induction plates has thus not been satisfactorily solved.

SUMMARY OF THE INVENTION

It is an object of this invention to provide cookware having good boiling, frying and baking properties and which can be used on all heat sources of interest, including induction plates.

This object is achieved according to the invention by providing a vessel of austenitic stainless steel having affixed thereto, e.g. to the bottom thereof, a heat distributing layer such as an extra base of a metal with good heat conductivity, for example copper or aluminum. Exteriorly of or to the bottom of this extra base is affixed a magnetizable layer, such as a magnetizable plate of mild steel. A feature of the present invention is that there are two or three intermediate layers between the layer of magnetizable steel and the heat-distributing layer or extra base of copper or aluminum.

These intermediate layers are comparatively thin, and they must be such that their coefficients of thermal expansion are between the coefficients of thermal expansion of the heat-distributing layer and the magnetizable layer. The shearing forces which arise between the two main layers, i.e. the heat-distributing layer and the magnetizable layer, during heating and which tend to cause the laminate to disintegrate are, through the structure according to the invention, spread over the two or three intermediate layers. The intermediate layers function as bonding layers and compensating layers for linear expansion. An intermediate layer can, by way of example, consist of a thin layer of nickel, copper, brass or austenitic stainless steel, which has been coated on one or both sides with a suitable brazing alloy. The most expedient way of building up the magnetizable plate is in the form of a roll-plated laminate with a core of mild steel. If the heat-distributing layer is of aluminum, and if it is bonded to the magnetizable plate by means of a brazing process, it is important that the brazing alloy be of a composition that also serves as a diffusion barrier between the aluminum and the austenitic stainless steel so as to avoid the formation of a brittle ferroaluminum phase.

It is a feature of the invention that the magnetizable steel plate is in the form of a unitary, non-perforated and unbroken surface from the periphery thereof to the center thereof, thus avoiding ring-shaped subdivisions.

It is known that rapid solidified amorphous steel, so-called "metallic glass", is better than ordinary mild steel for transformer cores, because it gives lower losses. It is a feature of this invention that the sheet or layer which constitutes the magnetizable and heat-producing layer in a cooking vessel according to the invention can be formed wholly or partly of amorphous rapid solidified steel. A further feature is that this layer can be protected on the outside, preferably by a layer of the same metal and of the same thickness as one of the intermediate layers on the inside.

Hotplates of ceramic glass are sensitive to surface scratches. Scratches from sharp edges can be the cause of cracks under the action of heat. A feature of this invention is that the magnetizable plate with the intermediate layers and coating is rounded and is drawn back from the outer edge so that the exposed outer periphery is rounded, or that it consists of a soft metal such as copper or aluminum. This also protects the edge of the steel against corrosion.

A further effect of having two or three intermediate layers is that the spread of heat is increased. Thus, intercrystalline layers in the brazing zones will act as temperature barriers, delaying the conduction of heat across the base and increasing the conduction of heat in radially.

BRIEF DESCRIPTION OF THE DRAWINGS

Other objects, features and advantages of the invention will be described in more detail below with reference to the accompanying drawings, in which.

DETAILED DESCRIPTION OF THE INVENTION

The following description deals with four specific embodiments of cooking vessels according to the present invention and employing specific materials for the various elements thereof. Those skilled in the art readily will understand however that the specific materials of the four specific embodiments may be interchanged and how.

Figure 1:
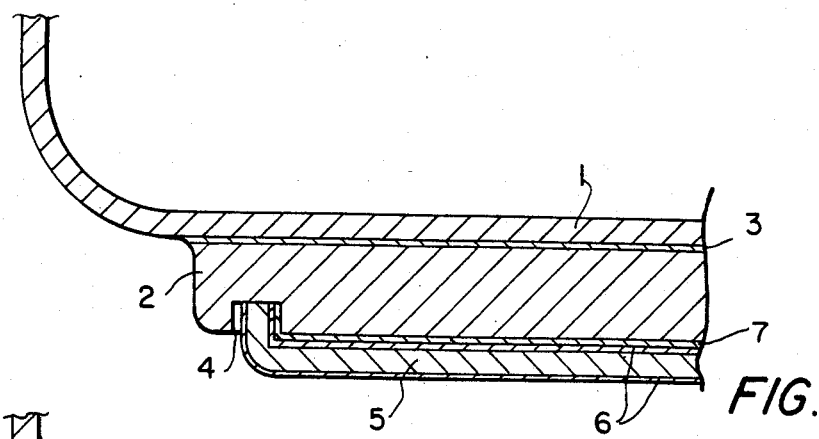
FIG. 1 is a section of part of a base of a cooking vessel of stainless steel with a heat-distributing plate of copper and with the peripheral part of a magnetizable plate embedded in a groove in the copper plate.

FIG. 1 illustrates a cooking vessel or container according to a first embodiment of the present invention. The container includes a base 1 of austenitic stainless steel. A heat distributing layer in the form of a plate 2 of copper is bonded to the bottom of the base of container 1 by means of a layer of hard solder 3. Through this description, the terms "hard solder", "soldering alloy" and "brazing alloy" will be employed to refer to compositions capable of achieving soldering or brazing of the particular elements involved. Those skilled in the art will understand what such brazing or soldering alloys may be employed to achieve a suitable bonding of the particular materials of the layers involved. The peripheral area of the bottom of copper plate 2 has formed therein a groove 4 the magnetizable layer comprising a plate without ring shaped division thereof. A magnetizable layer is in the form of a plate 5 of mild steel, onto both sides of which have been roll-plated respective thin layers 6 of nickel. The resultant laminate layer has a cylindrical flange at its outer peripheral edge, and this flange is pressed into the groove 4. The plate 5 with its coating layers 6 is bonded to copper plate 2 by means of a suitable hard solder 7. By this arrangement, the inner or upper thin layer of nickel 6 and the hard solder layer 7 form two intermediate layers, each of which is formed of a material having a coefficient of thermal expansion value between the values of the coefficients of thermal expansion of the materials of heat distributing layer 2 and magnetizable layer 5. These two intermediate layers function, not only to achieve a highly satisfactory bonding between plates 2 and 5, but additionally as compensating layers for linear expansion. The intermediate layers act to increase outward or radial heat conduction.

Figure 2:
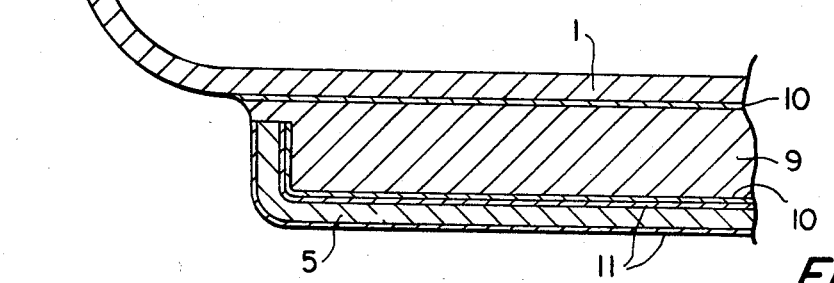
FIG. 2 is a section of part of a base of a cooking vessel of stainless steel in which a heat-distributing layer of aluminum is completely covered by a magnetizable laminated plate.

The structural arrangement of the embodiment of FIG. 2 varies from the embodiment of FIG. 1 in that the outer peripheral flange of the laminated magnetizable layer does not fit within a groove in the heat distributing plate, but rather fits within a peripheral recess therein to substantially completely cover the exterior thereof. Furthermore, the materials of the embodiment of FIG. 2 in some respects are different, still within the scope of the present invention. Thus, the vessel includes a base 1 of austenitic stainless steel, as in the embodiment of FIG. 1. However, the heat distributing layer is in the form of a plate 9 of aluminum. The magnetizable layer is in the form of plate 5 of mild steel, both sides of which are plated, for example by roll-plating, with austenitic stainless steel 11. The laminate of plate 5 and layers 11 is bonded to aluminum plate 9 by means of a layer of a soldering alloy 10. The plate 9 also is bonded to base 1 by such a layer of soldering alloy 10. Thus, the inner or upper coating or layer 11 of stainless steel and the bonding soldering alloy 10 form two intermediate layers between the magnetizable layer 5 and the heat distributing plate 9. These two intermediate layers each have a coefficient of thermal expansion value which is between the values of the coefficients of thermal expansion of the materials of the heat distributing layer 9 and the magnetizable layer 5, and thus these two intermediate layers operate to achieve the same functions described above regarding the embodiment of FIG. 1. The values of the coefficient of thermal expansion of the intermediate layers need not necessarily be the same.

Figure 3:
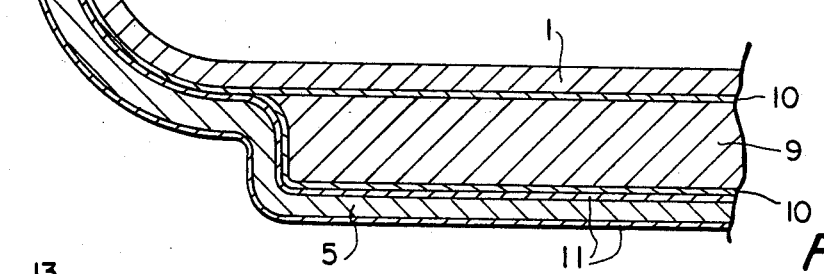
FIG. 3 is a section of part of a base with a laminated plate continuing up along the side of the vessel.

The embodiment of FIG. 3 is the same as the embodiment of FIG. 2, except that the laminated magnetizable layer is continued beyond the heat distributing plate 9 and covers the exterior walls of the vessel.

Figure 4:
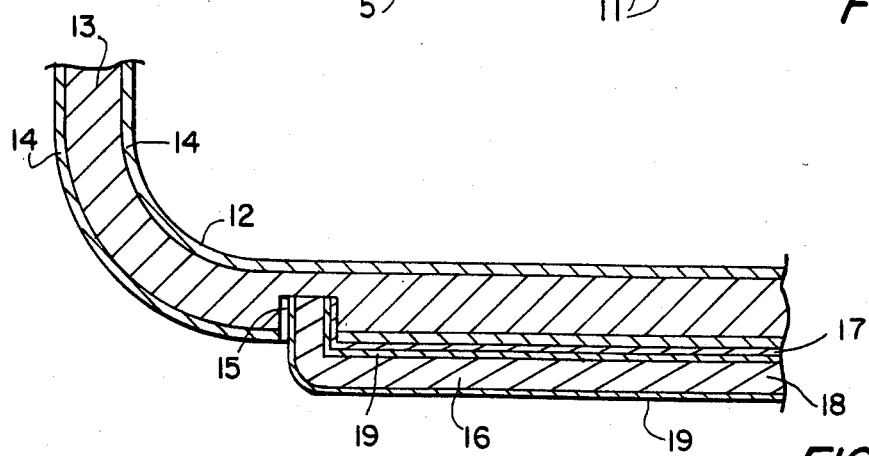
FIG. 4 is a section of part of a base provided with three intermediate layers.

The above embodiments of the present invention all include two intermediate layers between the magnetizable layer and the heat distributing layer. However, the present invention also is directed to arrangements wherein there are provided three intermediate layers between the magnetizable layer and the heat distributing layer. FIG. 4 shows such an arrangement. Thus, a cooking vessel, such as a saucepan, includes a body 12 in the form of a laminate including an aluminum core 13 covered on opposite sides thereof, for example by roll-plating, with thin layers 14 of stainless steel. It specifically is contemplated that layers 14 are of austenitic stainless steel. Aluminum core 13 forms the heat distributing layer in accordance with this embodiment. The bottom or base of vessel body 12 has formed therein a groove 15. A laminated plate 16 has an outer peripheral flange pressed into groove 15. Plate 16 includes a core 18 of mild steel plated, for example by roll-plating, on both sides thereof with thin layers 19 of austenitic stainless steel. The laminate plate 16 is bonded to the laminate vessel body 12 by means of a suitable solder layer 17. In this embodiment of the present invention, there thus are formed three intermediate layers between the magnetizable layer 18 and the heat distributing layer 13. These three laminate layers include the upper austenitic stainless steel layer 19, the solder layer 17, and the lower or outer austenitic stainless steel layer 14. Each of these three intermediate layers will have a coefficient of thermal expansion value between the values of the coefficients of thermal expansion of the magnetizable layer 18 and the heat distributing layer 13. This arrangement achieves the functions discussed above.

Those ordinarily skilled in the art will understand that other structural arrangements than those specifically shown in FIGS. 1 through 4 may be encompassed within the scope of the present invention. Furthermore, it will be understood that the various materials employed for the various elements of the embodiments of FIGS. 1–4 to a large degree may be interchanged, and those skilled in the art would understand what materials may be so combined and interchanged.

Furthermore, although the following explanations are given of various parameters of the present invention, it is intended that such explanations be exemplary and not limiting of the scope of the present invention, since those skilled in the art will understand what other compositions and/or ranges may be employed within the scope of the present invention.

Thus, suitable mild steels to form the magnetizable layers 5, 18 may be known mild steels of low carbon content, for example 0.08C per AISI C1010. The thickness of the various intermediate layers preferably is approximately 0.05 to 0.50 mm. Suitable examples of soldering alloys, hard solders, brazing alloys are as follows. If the heat distributing layer is aluminum, then Al-6:CU 0.006%, Zn 0.012% and Al 90.6% is suitable. If the heat distributing layer is copper, then C-40:Ag 19.4%, Zn 30.55% and Cd 11.37% is suitable. Again however, those skilled in the art would understand what other compositions would be suitable in accordance with the present invention. Examples of rapid solidified amorphous steel, i.e. amorphous metallic glass, are transformer sheets, Fe Co, Ferro Cobolt Alloy or amorphous $Co_{66} Fe_4 (Mo\ Si\ B)_{30}$. Of course, other such compositions as will be understood by those skilled in the art may be employed. An example of a suitable austenitic stainless steel is AISI 304, although other examples may be employed.

Comparative trials were conducted with cooking vessels according to the present invention and with two purchased vessels of conventional construction, herein referred to as vessels A and B. Each of these vessels were heated for one minute on an induction plate and then air cooled for five minutes. Vessel A withstood 45 cycles, vessel B withstood 630 cycles, while vessels according to the present invention remained intact and usuable after 10,000 cycles.

Furthermore, although specific examples of values of coefficients of thermal expansion of the various intermediate layers have not been set forth, those of ordinary skill in the art will understand from the above discussion what specific such values may be employed, keeping in mind the important feature of the present invention that the values of the coefficients of thermal expansion of the intermediate layers be between the values of the coefficients of thermal expansion of the heat distributing layer and the magnetizable layer.

Although the present invention has been described and illustrated with regard to preferred features thereof, various modifications and changes may be made to the specifically described and illustrated features without departing from the scope of the present invention.

I claim:

1. A cooking vessel suitable for being heated by induction heating means, said vessel comprising:
    a base of austenitic stainless steel;
    a heat distributing layer bonded to the exterior of said base, said heat distributing layer being formed of a metal having a high thermal conductivity;
    a magnetizable layer connected exteriorly of said heat distributing layer, said magnetizable layer comprising a plate having a unitary, non-perforated and unbroken structure from the periphery of said plate to the center thereof, without ring-shaped division thereof;
    means for preventing separation of said magnetizable layer from said heat distributing layer during heating of said vessel, said means comprising at least two intermediate layers provided between and connecting said magnetizable layer and said heat distributing layer, each said intermediate layer being formed of a material having a coefficient of thermal expansion value between the values of the coefficients of thermal expansion of the materials of said heat distributing layer and said magnetizable layer, said coefficient of thermal expansion values of said materials of said intermediate layers being different, and one of said intermediate layers comprising a soldering or brazing alloy.

2. A vessel as claimed in claim 1, wherein said metal of said heat distributing layer comprises copper.

3. A vessel as claimed in claim 1, wherein said metal of said heat distributing layer comprises aluminum.

4. A vessel as claimed in claim 1, wherein said magnetizable layer comprises mild steel.

5. A vessel as claimed in claim 1, wherein said magnetizable layer comprises amorphous metallic glass.

6. A vessel as claimed in claim 1, wherein said heat distributing layer is in the form of a plate.

7. A vessel as claimed in claim 6, wherein said plate has in the bottom thereof a groove, and said magnetizable layer has a peripheral flange pressed into said groove.

8. A vessel as claimed in claim 6, wherein said magnetizable layer substantially completely covers said plate.

9. A vessel as claimed in claim 6, wherein said magnetizable layer covers said plate and continues to extend beyond the plate and covers the exterior of the vessel.

10. A vessel as claimed in claim 1, comprising only two said intermediate layers between said heat distributing layer and said magnetizable layer.

11. A vessel as claimed in claim 10, wherein a first said intermediate layer comprises a coating on said magnetizable layer, and said one intermediate layer comprises a soldering or brazing alloy which bonds said coated magnetizable layer to said heat distributing layer.

12. A vessel as claimed in claim 11, wherein said first intermediate layer comprises nickel, copper, brass or stainless steel.

13. A vessel as claimed in claim 1, comprising three said intermediate layers between said heat distributing layer and said magnetizable layer.

14. A vessel as claimed in claim 13, wherein a first said intermediate layer comprises a coating on said magnetizable layer, a second said intermediate layer comprises a coating on said heat distributing layer, and said one intermediate layer comprising a soldering or brazing alloy which bonds said coated magnetizable layer to said coated heat distributing layer.

15. A vessel as claimed in claim 14, wherein said first and second intermediate layers comprise nickel, copper, brass or stainless steel.

16. A vessel as claimed in claim 1, wherein inner and outer surfaces of said magnetizable layer are coated with protective layers, the inner of which comprises one of said intermediate layers.

17. A vessel as claimed in claim 1, wherein said heat distributing layer extends along the entire outer side of the vessel.

* * * * *